United States Patent [19]

O'Connell

[11] 4,422,682

[45] Dec. 27, 1983

[54] DEVICE FOR CHECKING AND RESETTING SMOKE ALARMS

[76] Inventor: Thomas P. O'Connell, 5710 S. Sawyer Ave., Chicago, Ill. 60629

[21] Appl. No.: 321,093

[22] Filed: Nov. 13, 1981

[51] Int. Cl.[3] .................... B25J 1/80

[52] U.S. Cl. .................... 294/19 R

[58] Field of Search .................. 294/19 R, 19 A, 1 R, 294/1 CA, 104, 15, 16, 26; 81/346, 428 R, 3 R, 8.1; 7/1 M; D3/1, 2

[56] References Cited

U.S. PATENT DOCUMENTS

| | | | |
|---|---|---|---|
| D. 3,503 | 5/1869 | Nitsch | D3/2 |
| 4,001,903 | 1/1977 | Hay | 294/19 R |
| 4,325,375 | 4/1982 | Nevyas | 294/19 R |

*Primary Examiner*—James B. Marbert
*Attorney, Agent, or Firm*—Myers & Dvorak

[57] ABSTRACT

A checking device for checking the operativeness of smoke alarms and for resetting the smoke alarms once they have been triggered comprises an elongated member in the form of a rod having one end provided with means which are adapted to engage test buttons on the smoke alarms and on the other end thereof, a smoke wafting means in the form of a fan for removing or dissipating accumulated smoke on the interior of the smoke alarms. During a test procedure, the checking device is positioned against the smoke alarm so that the testing means engages a test button to thereby cause the smoke alarm to give off an audible alarm signal. Failure of the smoke alarm to respond during the testing procedure indicates the failure of an internal electrical source. The checking device is utilized for resetting the smoke alarm after it has been triggered by a spurious source of smoke or by-products of combustion, such as smoke arising out of cooking or smoking tobacco in confined quarters. When the smoke alarm is triggered by the above smoke pollutants, the checking device is wafted so that the smoke wafting means clears out the smoke from the interior of the smoke alarm. Thereafter, the other end of the checking device is used to position the testing means against the smoke alarm to deactivate the smoke alarm so that the audible alarm signal is turned off.

2 Claims, 4 Drawing Figures

DEVICE FOR CHECKING AND RESETTING SMOKE ALARMS

BACKGROUND OF THE INVENTION

1. Field of Invention

This invention relates generally to devices for checking the operations of warning devices, and specifically is concerned with a device for checking the operation of a smoke alarm installed on a ceiling or on a wall out of the reach of children.

2. Description of Prior Art

In the past few years, the popularity of smoke alarms has increased tremendously because of their ability to give early notice of incipient fires and other sources of smoke generation. The smoke alarms are generally self-contained, being provided with an internal electrical source such as a battery, and being adapted to be mounted on a ceiling or on a wall just below the ceiling, the foregoing being the best two places for positioning the smoke alarm to detect the presence of smoke or other by-products of an incendiary source. Also, the placement of the smoke alarms in the two foregoing positions keeps the alarms out of the reach of persons, particularly children, who might be tempted to tamper with the alarms.

The smoke alarms have to be checked periodically to determine whether they are in an operative condition, namely, that the internal electrical supply is capable of actuating the alarm. To do this, the smoke alarms are provided with a test means such as a test button which can be depressed, pulled or toggled to momentarily actuate the smoke alarm which will give off an audible alarm signal. Presently, there are no devices provided for this purpose, and, therefore, it is necessary that the person checking the smoke alarm has to use a ladder or some other structure to gain access to the smoke alarm to activate the test button.

Occasionally, the smoke alarm will be set off by an accumulation of smoke which is generated by other than incendiary conflagrations. For example, the smoke may be generated in a kitchen while frying foods or by someone smoking tobacco. When the smoke alarm is activated by the smoke originating from the foregoing sources, it is necessary to reset the smoke alarm to place it into an alert condition. To do so, it is necessary to dissipate the smoke inside the smoke alarm as well as in the area adjoining the smoke alarm. This is accomplished by taking some object like a newspaper and wafting air across the smoke detector to clear out the accumulated smoke and then, where applicable, resetting the button to deactivate the alarm signal. Again, the foregoing procedure would require the use of a ladder or some other structure to gain access to the smoke alarm.

SUMMARY OF THE INVENTION

Purposes of the Invention

It is an object of the present invention to provide a device for checking the operativeness of a smoke alarm mounted at a great height such as a ceiling or a wall adjoining the ceiling.

Another object of the invention is to provide a device for resetting the smoke alarm after it has been activated by a spurious source of smoke generation or other by-product of incendiary nature.

A still further object of the invention is to provide a device which is capable of checking and, or resetting the various forms of smoke alarms presently available on the market.

Other objects of the invention will be obvious, and further objects of the invention will be brought out in the description hereinafter.

BRIEF DESCRIPTION OF THE INVENTION

In order to test smoke alarms, at regular intervals, as recommended by the various manufacturers, test means such as a test button on the smoke alarm must be activated by a person performing the checking. Presently, there are no tools or devices available specifically designed for depressing the test button on the smoke alarm which may be used at home, apartment, or at place of business. Although manufacturers of smoke alarms recommend that they should not be placed in a kitchen, the smoke alarms are generally mounted in rooms adjacent the kitchen. Consequently, the smoke alarms are subjected to ions generated by an incendiary source during the cooking procedure or are also subject to a smoke generated during the cooking process. These ions or the smoke often cause the smoke alarm to sound a false alarm, thereby necessitating that the smoke alarm be reset to its previous alert condition.

To assist in the checking and resetting of the smoke alarms, the present invention is directed to providing a device for checking and resetting smoke alarms. Briefly, the checking device comprises a rod having one end provided with means for engaging a test button on a smoke alarm to determine if the smoke alarm is operative, and the use of the same means for resetting a test button on the smoke alarm after it has been set off by a false alarm. The other end of the rod is provided with a means such as a fan which is used for clearing the accumulation of smoke within the smoke alarm and the area adjacent to the smoke alarm.

The invention accordingly consists in the features of construction, the combination of elements, and the arrangement of parts, which will be exemplified in the construction hereinafter described, and of which the scope of the application will be indicated in the appended claims.

DESCRIPTION OF THE PREFERRED EMBODIMENTS

Figures 1, 2, 3, 4:
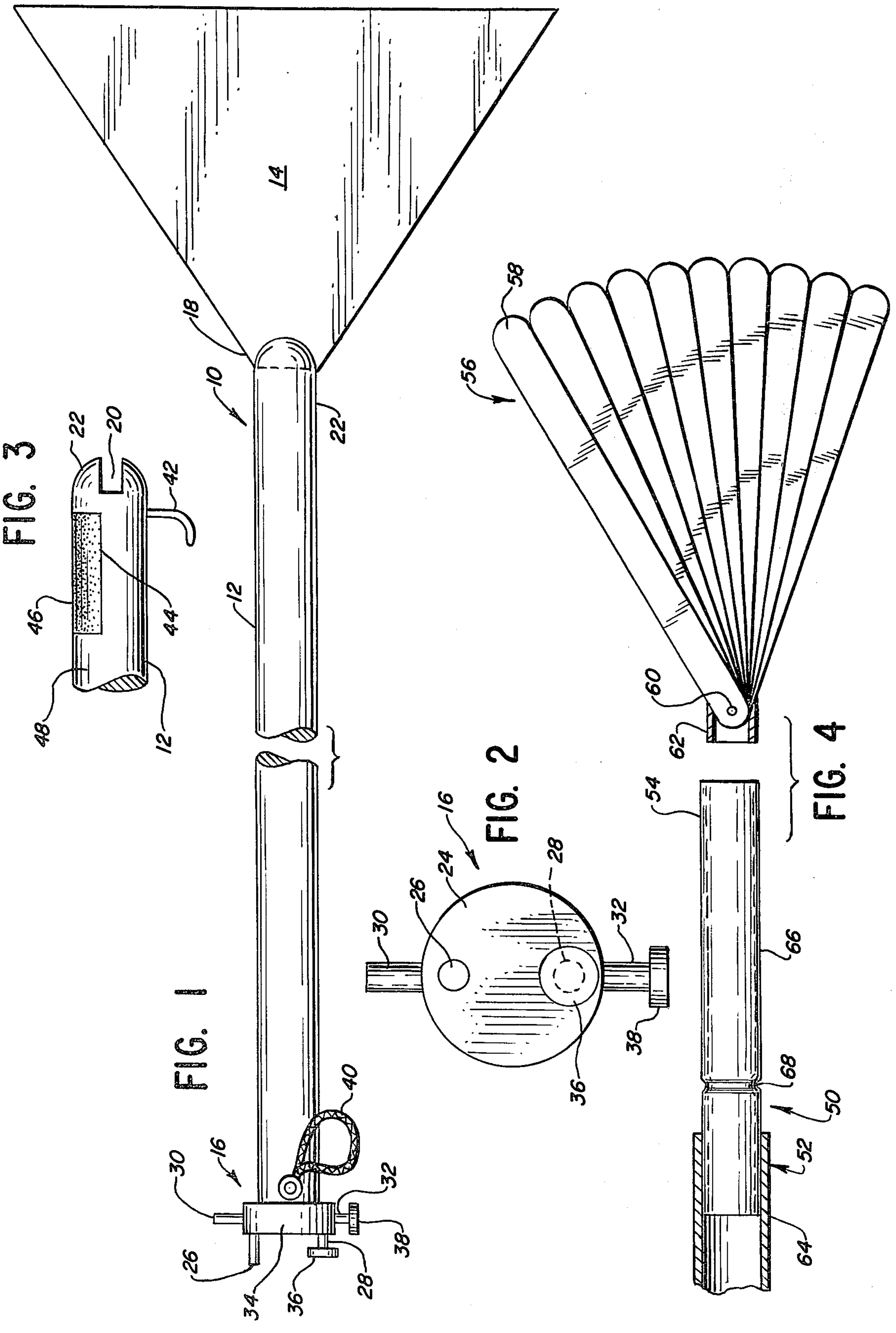
FIG. 1 is a top view of a checking device.
FIG. 2 is an enlarged end view of one end of the checking device.
FIG. 3 is an enlarged partial view of the other end of the checking device.
FIG. 4 is a partial plan view of the checking device having a modified form of a fan.

The preferred embodiment of the invention will now be described in reference to FIGS. 1–4.

A checking device 10 comprises an elongated member such as a rod 12 having one end terminating in a smoke wafting means such as a fan 14, and another end terminating in a testing means 16.

The fan 14 comprises a triangular configuration having one of its apices mounted in a slot 20 in an end 22 of the rod 12. Any known form may be used for securing the fan 14 to the end of the rod 12, for example, as by gluing, crimping or the use of a securing member such as a nail or screw.

The testing means 16 comprises a base 24 which, as shown in FIG. 2, may possess a circular configuration. The base 24 comprises a plurality of testing projections 26, 28 which extend out of the surface of the face of the base 24 in a direction generally parallel to the longitudinal axis of the rod 12. The base 24 is also provided with testing projections 30 and 32 which extend out of a side wall 34 in directions which are transverse to the longitudinal axis of the rod 12.

As is apparent, the function of the projections 26 amd 28 is to engage a test button (not known) on a smoke alarm which is mounted on a ceiling, whereas the testing projections 30 and 32 are adapted to be used on smoke alarms mounted on a wall. The testing projections 26 and 30 are rod-like members which are adapted to be inserted into bores containing the test buttons on smoke alarms, whereas the projections 28 and 32 are provided with buttons 36 and 38, respectively, which are adapted to engage test buttons extending out of the surface of a housing (not shown) of the smoke alarms.

The checking device 10, as previously indicated, is used for checking and resetting smoke alarms. In order to check the operativeness of a smoke alarm mounted on a ceiling or on a wall, the checking device 10 is held by hand adjacent to fan 14, and one of the testing projections 26, 28, 30 or 32 is pressed against the test button on the smoke alarm to cause the audible alarm signal to go on and indicate that the operating condition of the smoke alarm is acceptable. In the event that the smoke alarm is set off by smoke not of incendiary nature, the checking device 10 is held in hand adjacent the testing means 16, and the device is moved back and forth so that the fan 14 being wafted across the face of the smoke alarm will clear out the smoke inside the smoke alarm. Thereafter, the checking device 10 is held in hand adjacent the fan 14 so that the testing means 16 with one of its testing projections 26, 28, 30 or 32 may be brought in contact with the test button (not shown) on the smoke alarm to deactivate the alarm signal.

When the checking device is not used, it may be hung up on a wall by a hanging means such as a loop 40. Alternatively, as shown in FIG. 3, the checking device 10 may be provided with a hanging projection such as a hook 42. The end 22 of the checking device 10 may be provided with an embedded magnet member 44 having an exterior surface 46 flush with the rounded contour 48 of the rod 12 so that the checking device may be supported from a vertical steel or iron surface such as found on a register at the end of a heating duct in a heating system in a building.

A second embodiment of the invention is shown in FIG. 4, wherein a checking device 50 comprises an elongated member in the form of a telescopic rod 52, one end 54 thereof being provided with a smoke wafting means such as a fan 56. The other end of the rod 52 is provided with a testing means (not shown) which is similar to the testing means 16 described in reference to FIGS. 1–3. The fan 56 is made from a series of leaves 58 which have ends thereof commonly connected by a pivot pin 60 to a tubular housing 62. The rod 52 comprises a pair of tubular sections 64 and 66, the latter tubular section being slidably disposed within the tubular section 64. As shown in FIG. 4, the tubular housing 62 supporting the leaves 58 is adapted to be slidably disposed in the interior of the tubular section 66. The internal travel of the tubular housing 62 within the tubular section 66 is limited by a crimp 68. The embodiment shown in FIG. 4 can be compactly collapsed by pushing the tubular section 66 into the tubular section 64 and then collapsing the fan 56 so that the leaves 58 and the housing 62 can be pushed into the interior of the tubular section 66.

The checking device 50 is used in the same manner as the first embodiment described in reference to FIGS. 1–3. In use the collapsed form of the checking device 50 is extended into its full working position by pulling out the tubular section 66 out of the tubular section 64 and then pulling out the fan 56 out of the tubular section 66 and then fanning out the leaves 58 to form the fan 56.

In a typical checking device 10 which was constructed, the rod 12 was a wooden rod having 1.0 inch diameter, the end 22 being provided with the slot 20 having a 1–8 inch width to accept the fan 14 made from a plate having a 1–8 inch thickness. The fan 14 has a length of about 6 inches with the distance between the free corners being about 9 inches. The base 24 comprises a 1 and $\frac{1}{2}$ inch diameter disc supporting the testing projection 30 which extends about $\frac{1}{2}$ inch out of the side wall 34. The testing projection 32 extends about $\frac{1}{2}$ inch out of the side wall 34 and terminates in a button 38 having a $\frac{1}{2}$ inch diameter. The testing projection 30 is a rod having a $\frac{1}{4}$ inch diameter. The dimensions of the testing projections 26 and 28 are comparable to those described in reference to testing projections 30 and 32, respectively.

Although a specific embodiment has been described in detail, it is apparent that many modifications and variations in the present invention can be made within the bounds of the above description. It is, therefore, to be understood that the present invention, as defined by the scope of the appended claims, can be practiced in other ways.

What is claimed is:

1. A device for checking and resetting a smoke alarm provided with an internal electrical source for sounding an alarm and adapted to be mounted on a ceiling or a wall, said smoke alarm being provided with test and reset button means, said device comprising an elongated member having one end provided with testing means and the other end provided with smoke wafting means, whereby said testing means are adapted to engage said test and reset button means to activate or reset the smoke alarm, and said smoke wafting means is wafted across an activated smoke alarm to clear the smoke out of the interior of the smoke alarm before it can be deactivated by said testing means, wherein said elongated member comprises a tubular rod having a pair of sections, one section telescopically related with the other section, said smoke wafting means comprising a fan formed by a plurality of overlapping leaves, a housing for supporting said fan, and a pivot pin commonly connecting one set of ends of said leaves and securing same to said housing, said housing being slidably receivable in the interior of one of said sections, and means for limiting the inward movement of said fan into said one section, whereby, for storing said device, the two sections are telescoped together, the fan leaves are collapsed and the fan and its housing are pushed into the confines of said one section, and wherein said testing means comprises a base attached to said one end of the elongated member, a pair of testing projections extending outwardly from the face of said base, one of said projections terminating in a button, another pair of projections extending out of a side wall of said base, one of said side wall projections terminating in a button, said smoke wafting means comprising a fan structure.

2. A device for checking and resetting a smoke alarm provided with an internal electrical source for sounding an alarm and adapted to be mounted on a ceiling or a wall, said smoke alarm being provided with test and reset button means, said device comprising an elongated member having one end provided with testing means and the other end provided with smoke wafting means, whereby said testing means are adapted to engage said test and reset button means to activate or reset the smoke alarm, and said smoke wafting means is wafted across an activated smoke alarm to clear the smoke out of the interior of the smoke alarm before it can be deactivated by said testing means, wherein said elongated member comprises a tubular rod having a pair of sections, one section telescopically related with the other section, said smoke wafting means comprising a fan formed by a plurality of overlapping leaves, a housing for supporting said fan, and a pivot pin commonly connecting one set of ends of said leaves and securing same to said housing, said housing being slidably receivable in the interior of one of said sections, and means for limiting the inward movement of said fan into said one section, whereby, for storing said device, the two sections are telescoped together, the fan leaves are collapsed and the fan and its housing are pushed into the confines of said one section, and wherein said testing means comprises a base attached to said one end of the elongated member, a pair of testing projections extending outwardly from the face of said base, one of said projections terminating in a button, another pair of projections extending out of a side wall of said base, one of said side wall projections terminating in a button, said smoke wafting means comprising a fan structure, including means incorporated with said elongated memmber for supporting said device from a support surface.

* * * * *